United States Patent [19]

Edelman et al.

[11] 4,318,813

[45] Mar. 9, 1982

[54] MEMBRANE PLASMAPHERESIS MODULE

[75] Inventors: William Edelman, Buffalo Grove; James R. Hitchcock, Jr., Barrington; William J. Schnell, Wheeling, all of Ill.

[73] Assignee: Baxter Travenol Laboratories, Inc., Deerfield, Ill.

[21] Appl. No.: 164,735

[22] Filed: Jun. 30, 1980

[51] Int. Cl.³ .............................................. B01D 31/00
[52] U.S. Cl. .............................. 210/321.4; 210/433.2; 210/451; 422/48; 128/DIG. 3; 261/DIG. 28
[58] Field of Search ............... 210/247, 321, 433, 445, 210/451, 455, 456, 487, 488, 493, 927; 128/214 B, DIG. 3; 261/DIG. 28; 285/200; 422/48

[56] References Cited

U.S. PATENT DOCUMENTS

| | | | |
|---|---|---|---|
| 3,827,563 | 8/1974 | Boe et al. | 210/321.3 |
| 3,907,687 | 9/1975 | Hoeltzenbein | 210/321.3 |
| 4,154,792 | 5/1979 | Miller et al. | 210/321.4 X |

Primary Examiner—Benoit Castel
Assistant Examiner—David R. Sadowski
Attorney, Agent, or Firm—Paul Flattery; Daniel D. Ryan

[57] ABSTRACT

A membrane plasmapheresis module (10) comprises semipermeable membrane means (11) capable of permitting blood plasma to pass therethrough while preventing the passage of blood cells, and sealed housing means (18, 19) defining a blood inlet port (43) and blood outlet port (44) positioned adjacent opposite ends of a first flow path (60) extending along one side of the membrane (11). The housing (18, 19) also defines a plasma outlet port (38) adjacent one end of separate, second flow paths (62) extending along the other side of the membrane (11). The membrane (11) may be folded together about a fold line (12) to define a pair of membrane portions (14, 16) lying against each other. The first flow path (60) extends between the membrane portions (14, 16) and the second flow path (62) may optionally extend between each membrane portion (14, 16) and a wall of the sealed housing means (18, 19), or alternatively an adjacent fold (12) of the membrane portion. A plasma outlet port (38) is defined through the housing (18, 19) at a position spaced from the membrane (11). Channels (21) are defined in the interior surface of the housing (18, 19) and positioned to face the membrane (11) to serve as a manifold to collect blood plasma from the second flow path (62). The above-described channel (21) also extends across the fold line (12) into flow communication with the plasma outlet port (38). Also, blood inlet and outlet ports (43, 44) may extend in telescopic relation with aperture ports (40, 42) in the housing for securence of the inlet and outlet ports (43, 44).

6 Claims, 4 Drawing Figures

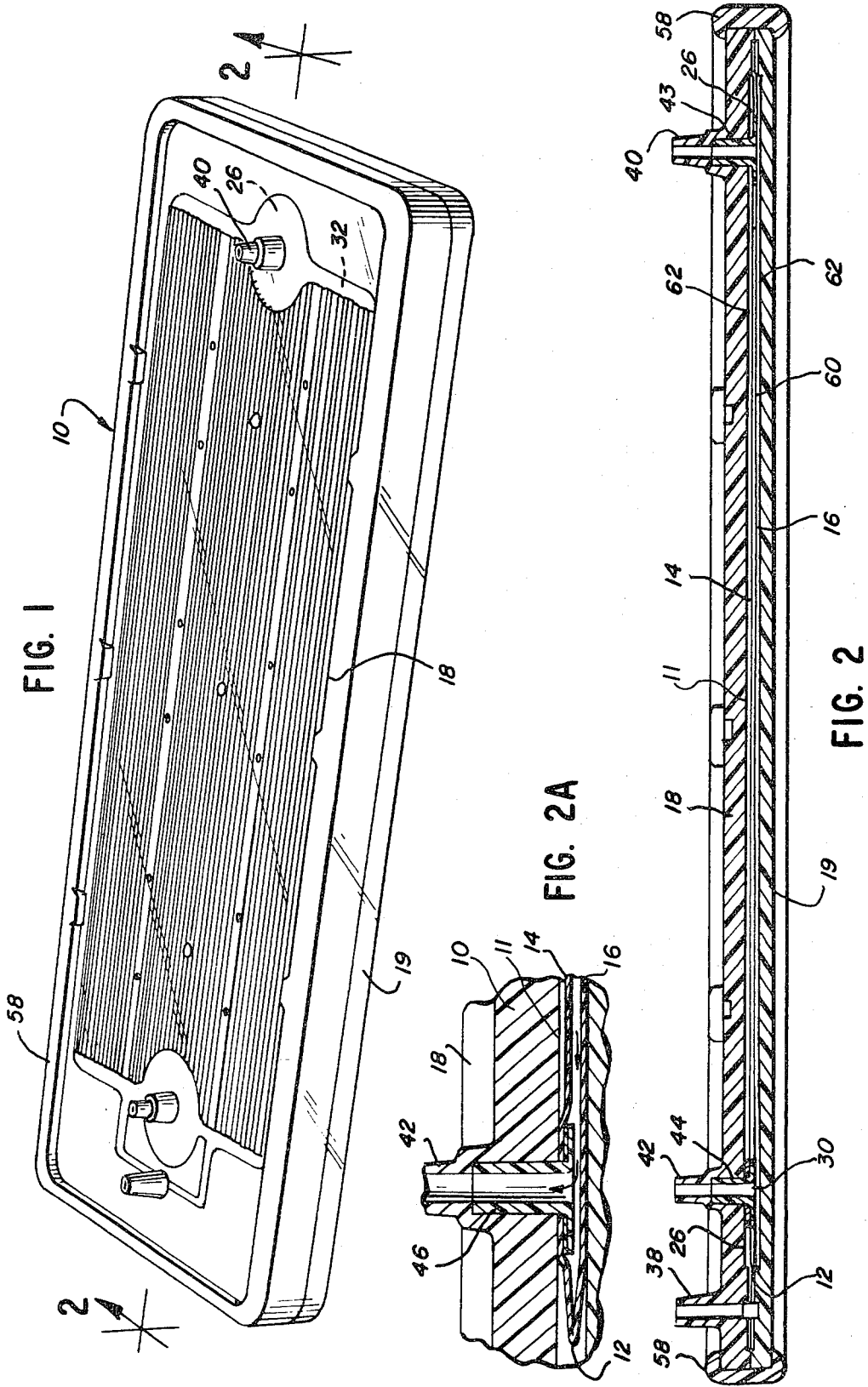

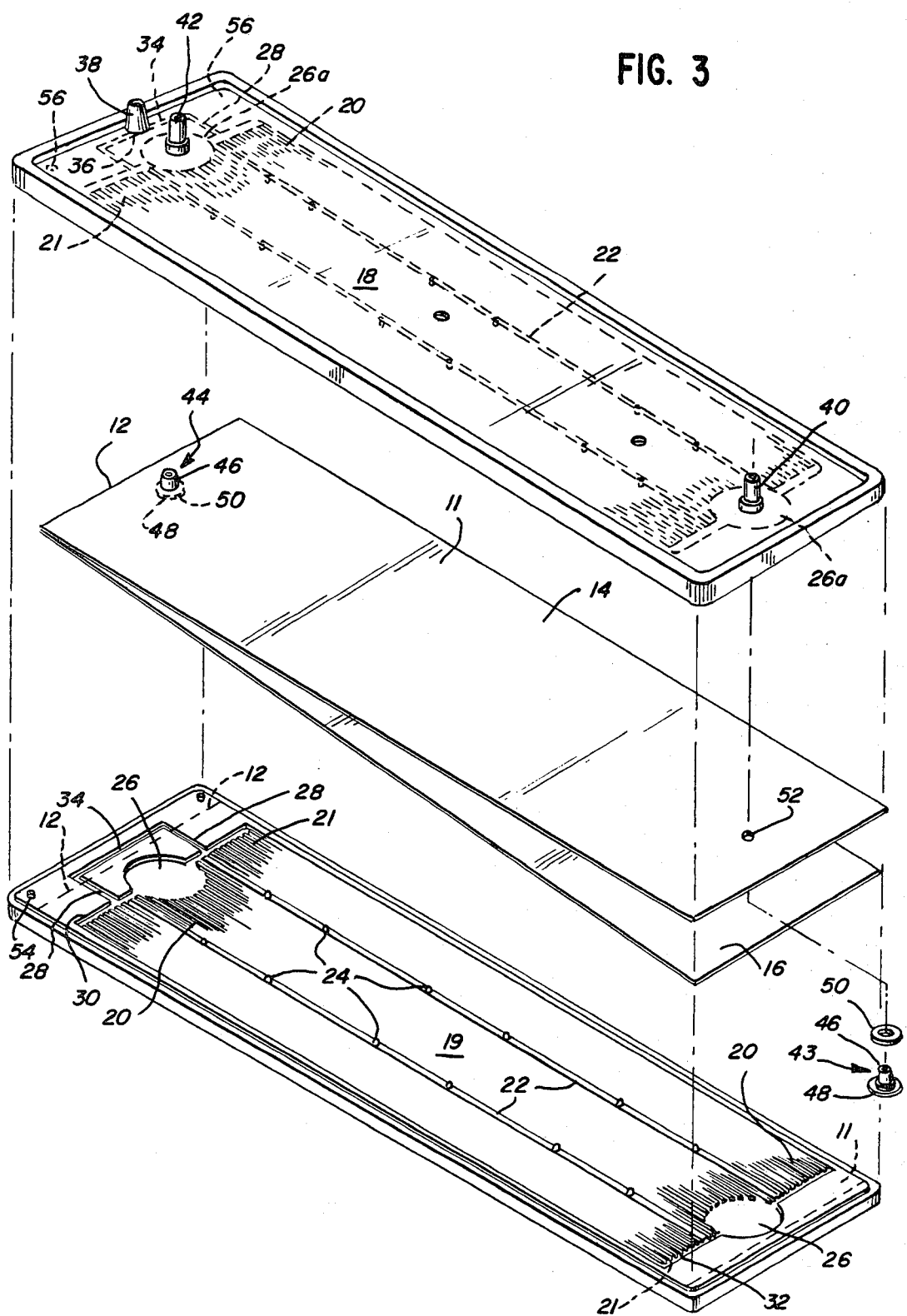

MEMBRANE PLASMAPHERESIS MODULE

BACKGROUND OF THE INVENTION

Membrane plasmapheresis utilizes a porous membrane, for example one made of polysulfone resin, which permits the extraction of plasma by diffusion through the membrane while preventing passage of the blood cells. For example, Brown et al, U.S. patent application Ser. No. 140,111, filed Apr. 14, 1980, discloses a current commercial membrane plasmapheresis apparatus.

Generally, the membrane plasmapheresis apparatus will include a "hardware" portion, with pumps, brackets for holding blood flow tubing, and other necessary apparatus as illustrated, for instance, by the above-described patent application.

Typically, membrane plasmapheresis devices utilize a disposable plasmapheresis module carried by the "hardware", which module contains the plasmapheresis membrane positioned within a housing to define the first and second flow paths on opposite sides of the membrane respectively, for blood flow and for collected plasma flow. The module will then be connected to disposable tubing and other blood contacting components, all of which are generally replaced after each plasmapheresis operation.

In accordance with this invention, a design of semipermeable membrane diffusion device is provided which is particularly used with advantage as a membrane plasmapheresis module, although it may be utilized in other forms of semipermeable membrane diffusion as desired, for example for blood oxygenation, or dialysis either for blood or other materials. Advantages of reliable sealing coupled with simplicity are provided by this invention for improvement in both the reliability, simplicity, and consequently the cost of membrane diffusion devices, and particularly the specially contemplated membrane plasmapheresis module.

DESCRIPTION OF THE INVENTION

In this invention, a diffusion device, and particularly a membrane plasmapheresis module, comprises semipermeable membrane means and sealed housing means defining access ports positioned adjacent opposite ends of a first flow path extending along one side of the membrane means. The housing means also defines access port means to a second flow path extending along the other side of the membrane means.

In accordance with this invention, the membrane means is folded together about a fold line to define a pair of membrane portions lying against each other. The first flow path means extends between the membrane portions, while the second flow path extends along the outer surface of each folded membrane portion and a wall of the sealed housing means, or alternatively a support plate, if a stacked membrane design is utilized.

An access or plasma outlet port is defined through the housing at a position spaced from the membrane means. Channel means are defined in the interior surface of the housing and positioned to face the membrane means, to serve as a manifold to communicate with the second flow path. The channel means also extends across the fold line into flow communication with the access port.

A major advantage of the above construction lies in the fact that the membrane means does not need to be sealed along its fold line, since the fold line itself serves to separate the first flow path within the folded membrane from the second flow path running along the exterior surfaces thereof. This permits a substantial simplification of the type of channel means which may be defined in the housing (or in plates that may be used to separate multiple layers of the membrane means in a stack, if that sort of construction is utilized). For example, in U.S. Pat. No. 4,016,081 relating to a staged membrane diffusion device and membrane support, it can be seen that a relatively complex structure is required in the membrane support plates at the ends of the membranes, where channel means pass from communication with the membranes to an inlet or outlet channel, with a bridge member passing over the channel, and the channel itself facing, in one segment, one side of the plate, and in another segment the other side.

By this invention, a simple groove may serve as the channel means without complex structure, which decreases the difficulty and cost of molding of the structures of this invention, since the channels used herein do not have to exercise a function of sealing the end of the membrane means. The fold line accomplishes that purpose.

Further in accordance with this invention, the access ports of the first flow path, which may define inlet and outlet parts, each may extend through an aperture in one of the pair of membrane portions. The housing means defines a pair of tubular aperture ports attached to the housing, with the inlet and outlet ports extending respectively through said aperture ports in telescopic relation therewith, for securence of the inlet and outlet ports. As the result of this, there is no danger of slippage of the inlet and outlet ports with respect to the membrane, and a simple positioning means is thus provided.

Preferably, the first and second flow paths are defined along the majority of their lengths by a profiled surface on the membrane-facing walls of the housing means. Alternatively, the flow paths may be defined by profiled surfaces of such separating plates as may be used in a multiple-layer membrane diffusion device.

Furthermore, in the instance where a single folded membrane layer is used, or a small number of folded membrane layers in a stack, the housing means preferably comprises a pair of facing plates enclosing the folded membrane means, with the plates being retained and sealed about their periphery by a unitary, molded plastic frame member in a manner analogous to that disclosed by U.S. Pat. No. 3,907,687, but distinguished by the fact that the housing in this instance may comprise flat plates rather than the hollow, flanged shells utilized in the cited patent.

Furthermore, it is preferred for the frame member to define integral projections extending over the outer faces of the plates for added retention capability of the structure.

It is also preferable to utilize a single, folded membrane in accordance with this invention as a plasmapheresis cell, with the membrane being sandwiched between a pair of profiled plastic plates sealed about their periphery with the molded frame as described above.

In the drawings, FIG. 1 is a perspective view of a membrane plasmapheresis module made in accordance with this invention.

FIG. 2 is a longitudinal sectional view of the module of FIG. 1, taken along line 2—2 of FIG. 1.

FIG. 2A is a detailed sectional view of the module of FIG. 1.

FIG. 3 is an exploded perspective view of the membrane plasmapheresis module of FIG. 1.

Referring to the drawings, the membrane plasmapheresis module 10 specifically shown herein includes a plasmapheresis membrane 11, which may be made, for example, of a known polysulfone material. Membrane 11 is folded together about fold line 12 to define a pair of membrane portions 14, 16 lying against each other. Membrane 11 is enclosed with a pair of generally rigid plates 18, 19, preferably identical in shape, except as otherwise described. Plates 18, 19 may be made of a molded plastic, and typically may have a slight amount of flexibility to permit control of the thickness of the module by means of a mechanical or pneumatic pressure means, so as to counterbalance the blood pressure in the first flow path and to control the blood film thickness in any manner desired.

Plates 18, 19 furthermore preferably define a profiled surface on each of their inner faces of identical design except as otherwise stated. Specifically in the embodiment shown, the profiled surfaces comprise spaced ribs 20 to define flow channels 21 along the membrane. Enlarged rib members 22 may be present, with ejector plugs 24, which are projections to facilitate the removal of each plate from the mold.

Each plate 18 also provides a depression 26, 26a adjacent each end, where the thickness of plates 18, 19 is reduced.

Also, plasma outlet grooves 28 are provided at one end of each plate 18, 19, as well as transverse grooves 30, communicating with the flow channels 21 between ribs 20, and also communicating with a depression 26.

A corresponding transverse groove 32 is provided at the end of each plate which is free of plasma outlet grooves 28. Finally, outer transverse groove 34 communicates with plasma outlet grooves 28 and also communicates with an aperture 36 and tubular plasma outlet port 38 which are preferably carried by plate 18, but not plate 19.

Accordingly, plates 18 and 19 are substantially identical in the shape of their profiled surface on their inner surface. However, plate 18 carries various inlet and outlet ports on its outer side which are not found in plate 19, and plate 19 does not define an aperture 36.

Plate 18 also carries tubular blood aperture ports 40, 42, each of which communicate through to the inner surface of plate 18 at a central portion of depressions 26a, which correspond in structure and function to depressions 26 of plate 19.

Folded membrane 11 is associated with a blood inlet port 43 and a blood outlet port 44 of identical shape. As can be seen from FIG. 3, each of the ports 43, 44 defines a tubular portion 46 which terminates in a flange 48, each of ports 43, 44 being preferably a one-piece, molded plastic structure. Gasket rings 50 are also provided to eliminate leakage.

In use, blood inlet port 43 and blood outlet port 44 are positioned with flange 48 and gasket member 50 placed between membrane portions 14, 16, with each respective tubular portion 46 projecting through a hole 52 punched in the upper membrane portion 14.

Upon assembly of the parts, the tubular portions 46 of blood inlet port 43 and outlet port 44 project respectively into the bores of aperture ports 40, 42 in telescoping relationship, to affix the positions of ports 43, 44, and to retain them.

At the same time, fluids such as blood can readily pass through ports 43, 44, because flange 48 in each case may be slightly spaced from the wall of depressions 26 against which they face, ports 43, 44 being retained in tight interfitting and sealing relationship with aperture ports 40, 42 carried by plate 18.

Accordingly, as membrane 11 is pressed between plates 18, 19, the plates are positioned together by means of locator pins 54, which fit into apertures 56 for exact positioning between plates 18, 19, to preferably cause the grooves 21 defined between longitudinal parallel ribs 20 to match one another, so that ribs 20 maintain and support membrane portions 14 and 16 so that the flow path between membrane portions 14, 16 may be approximately 0.006 to 0.01 inch thick under conditions of use, i.e., a blood pressure of about 100–250 mm. of mercury. Furthermore, the respective transverse grooves 30, 32 of each of the plates 18, 19 are preferably designed to abut one another, and preferably plasma outlet grooves 28 and outer transverse grooves 34 of each of plates 18 and 19 also face one another in the completed membrane plasmapheresis module.

As shown in FIGS. 2 and 3, folded edge 12 of membrane 11 is positioned at a location intermediate of the ends of plasma outlet grooves 28, so that outer transverse groove 34 and plasma outlet port 38 are spaced from the membrane means 11.

Accordingly, membrane 11 may be sealed about the three edges of its periphery, other than fold line 12, but it does not have to be sealed at fold line 12 since the fold forms its own seal, preventing liquids between membrane portions 14, 16 from leaking without passing through the semipermeable membrane, since fold line 12 is a continuous surface.

The remaining peripheral surfaces of membranes 11, apart from fold line 12 may be sealed between plates 18, 19 by a pressure seal, reinforced as desired by heat sealing or other sealing as required. Specifically, the sandwich formed of plates 18, 19, with membrane 11 between them, may be placed into an injection mold, and a "picture frame" 58 of plastic may be molded about the edges to hold plates 18, 19 together in their desired position. The plastic material used in this invention for picture frame 58 and also for plates 18, 19 and other parts may be conventional "ABS" plastic or any other thermoplastic material as desired. Also, the edge of the periphery of membrane 11 may project out from the periphery of plates 18, 19 on one or all of the sides with the exception of edge 12, so that the molded picture frame 58 interacts with the edges of membrane 10 as well as the edges of plates 18, 19 for added retention capability, if desired.

Accordingly, in operation using the completed membrane plasmapheresis module of this invention, pressurized blood may be passed into blood aperture port 40. The module 10 may be positioned vertically or horizontally as desired during the operation.

The blood passes through blood inlet port 43 into depression 26, and then along transverse groove 32, to flow along the various grooves 21 defined between ribs 20 on both of plates 18, 19. The flow of blood is, of course, restricted to the first flow path 60 between membrane portions 14, 16.

During this procedure, blood plasma passes through the walls of membrane portions 14, 16 into second flow paths 62, while the remainder of the blood, having a higher hematocrit because of the loss of plasma, proceeds onwardly. The blood is collected between membranes 14, 16 by means of the indentation defined by transverse groove 30, flowing into the enlarged area permitted to be formed between membrane portions 14, 16 by the adjacent depression 26. From there, the blood of higher hematocrit flows out of blood outlet port 44, through blood aperture port 42 into tubing of conventional design, which conveys the high hematocrit blood back to the patient.

In the meanwhile, collected blood plasma flows in second flow path 62 along the outside surfaces of membrane portions 14, 16 and the inside surfaces of plates 18, 19 into communication with either transverse groove 30 or depression 26 which communicates with transverse groove 30. From there, the plasma can flow through the respective grooves 28 of plates 18 and 19, crossing fold line 12 in their passage along grooves 28, and thus becoming separated from membrane 10.

Thereafter the plasma can flow in outer transverse grooves 34 of plates 18, 19, which face each other in a relationship not separated by membrane 10, and thus define a single, elongated transverse chamber which, in turn, communicates with plasma outlet port 38. Port 38 may, in turn, communicate with tubing leading to a collection bag for the plasma.

The membrane module of this invention will typically be used as a component of known plasmapheresis hardware apparatus, providing a reliable, sealed, inexpensive, and disposable component for a single plasmapheresis operation. Its maximum blood volume is low, and it may be easily sterilized with ethylene oxide or other desired technique.

The above has been offered for illustrative purposes only, and is not intended to limit the invention of this application, which is as defined in the claims below.

That which is claimed is:

1. A membrane plasmapheresis module comprising semipermeable membrane means operative for filtering the plasma from whole blood, said membrane means being folded together about a fold line to form a pair of facing membrane portions defining therebetween a flow path for whole blood,
   means on one of said membrane portions for defining a pair of apertures at oppositely spaced positions along said whole blood flow path,
   a tubular port member associated with each of said apertures, each of said port members including a stem portion extending outwardly through said associated aperture and a flange portion inwardly disposed against the interior of said one membrane portion,
   a pair of plates adjacently disposed to said membrane portions and together sealingly enclosing said membrane portions, and
   portions integrally formed on said one plate defining means which are adjacent disposed to said one membrane portion for forming thereon a pair of outwardly extending, generally rigid tubular members each axially aligned with a respective one of said tubular port members and engagable in telescopic, interference fit relationship about said respective outwardly extending stem portion to affix the positions of both of said tubular port members relative to said one membrane portion.

2. A membrane plasmapheresis module according to claim 1
   wherein each of said plates includes
      a first portion positioned in general overlying alignment with a respective one of said membrane portions and having an interior surface facing said respective membrane portion to define therebetween a volume into which the plasma filtrate passes, and
      a second portion extending from said first portion laterally beyond said fold line of said membrane portions, said second portions together defining a chamber which is laterally spaced from said fold line, which communicates with each of said plasma filtrate volumes, and into which plasma filtrate from each of said plasma filtrate volumes collects,
   and further including means on one of said plates defining an outlet port communicating with said plasma collection chamber.

3. A membrane plasmapheresis module according to claim 2
   and further including channel means associated with each of said first portions to serve as a manifold for conducting plasma filtrate from said volumes toward said plasma filtrate chamber.

4. A membrane plasmapheresis module according to claim 3
   wherein said second portion of each of said plates includes an interior surface, and
   wherein said channel means includes a portion which extends across said fold line and onto said interior surface of each of said second portions in flow communication with said plasma filtrate chamber.

5. A membrane plasmapheresis module according to claim 4
   wherein said channel means includes a plurality of spaced ribs extending axially of said whole blood flow path and defining a plurality of flow channels for the plasma filtrate, and a groove extending transversely of and in communication with each of said plasma filtrate flow channels adjacent to said fold line, and
   wherein said portion of said channel means which extends across said fold line includes a spaced pair of additional plasma filtrate flow channels communicating with said groove and extending generally parallel to said ribs.

6. A membrane plasmapheresis module according to claim 5
   wherein said plasma filtrate chamber includes a flow channel disposed in flow communication with said outlet port and extending between and in flow communication with said spaced pair of additional flow channels.

* * * * *